PRINTED CIRCUITS WITH RESISTIVE AND CAPACITIVE ELEMENTS
Filed May 12, 1960 2 Sheets-Sheet 1
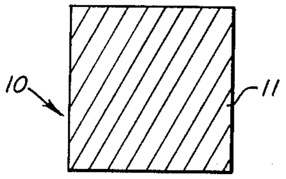
FIG. 1A
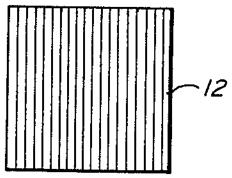
FIG. 1B
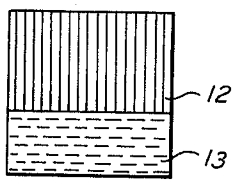
FIG. 1C
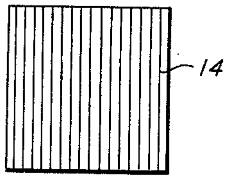
FIG. 1D
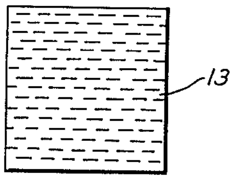
FIG. 1E
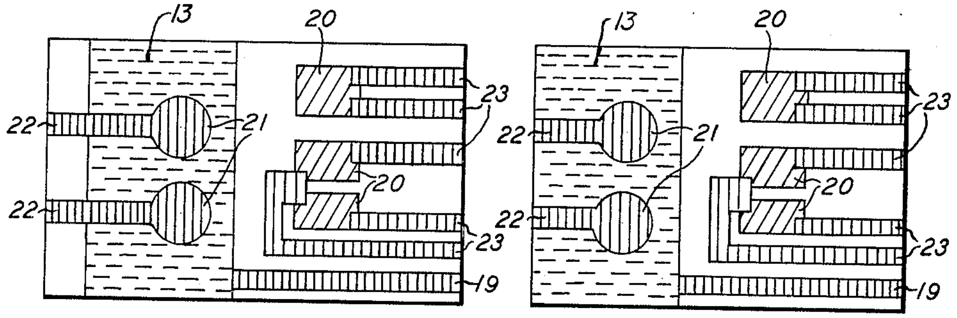
FIG. 10 FIG. 11
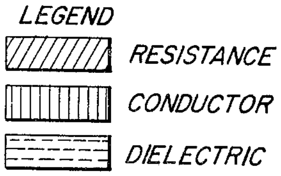
INVENTOR.
JOHN J. KINSELLA
BY FREDERICK A. SCHWERTZ
George W. F. Simmons
ATTORNEY

PRINTED CIRCUITS WITH RESISTIVE AND CAPACITIVE ELEMENTS

Filed May 12, 1960 2 Sheets-Sheet 2

INVENTOR.
JOHN J. KINSELLA
BY FREDERICK A. SCHWERTZ
George W. F. Simmons
ATTORNEY United States Patent Office 3,217,209

Patented Nov. 9, 1965

3,217,209

PRINTED CIRCUITS WITH RESISTIVE AND CAPACITIVE ELEMENTS

John J. Kinsella, Rochester, and Frederick A. Schwertz, Pittsford, N.Y., assignors to Xerox Corporation, a corporation of New York Filed May 12, 1960, Ser. No. 28,642
4 Claims. (Cl. 317—101)

Figures 2, 2A, 3, 3A, 4, 4A, 5, 5A, 6, 6A, 7, 7A, 8, 8A, 9, 9A:
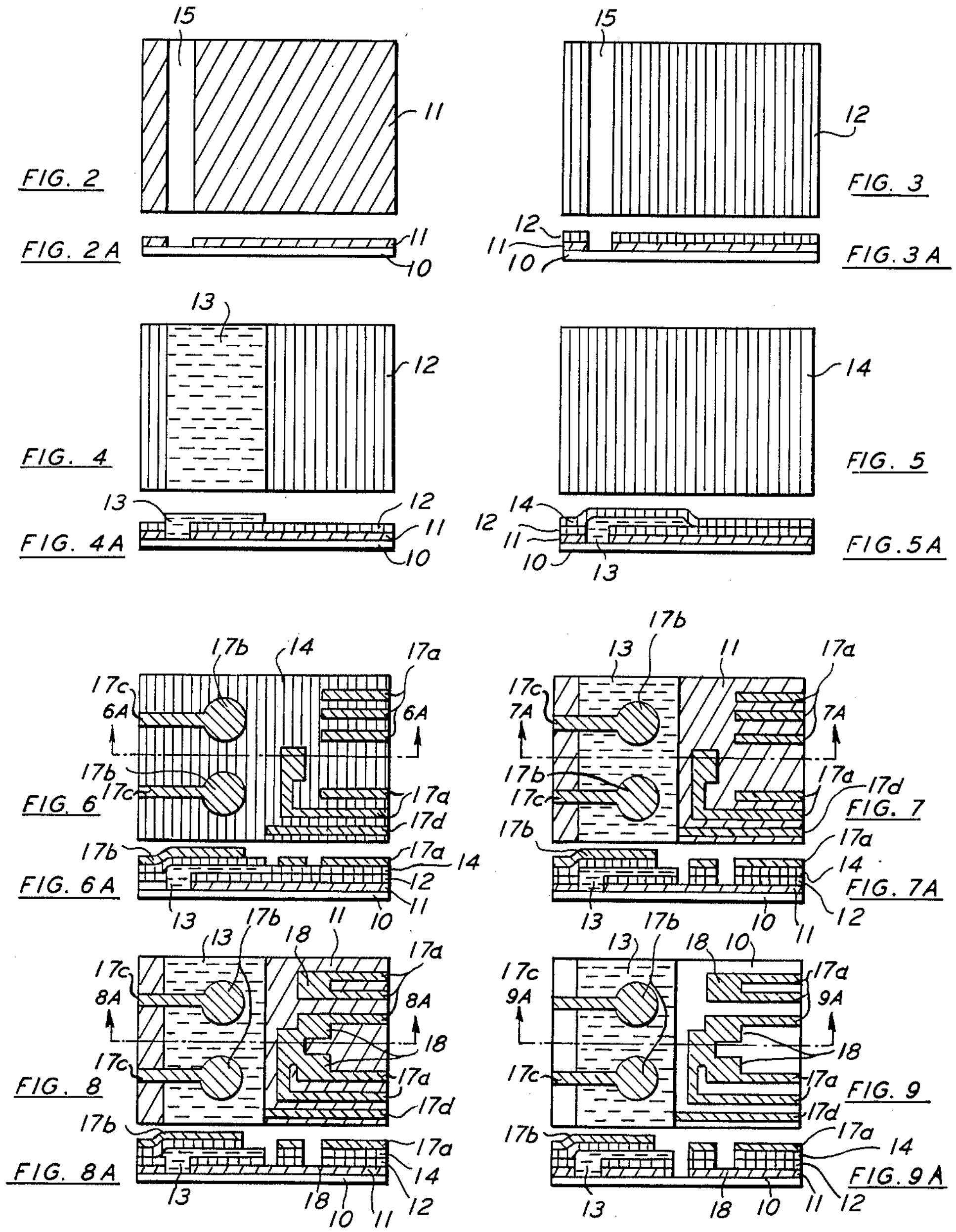

The present invention relates to improvements in electronic construction and particularly to an improved method for producing electrical apparatus of the printed circuit type.

Printed circuits and their fabrication are well known and essentially they consist of a dielectric substrate coated with a conductive material to form electrical conducting lines. With such circuit panels it has been customary to include circuit elements such as resistors, condensers and transistors as prefabricated components, these component elements being attached to the conducting lines of a printed circuit panel as by soldering. The conductive lines have been made by various etching processes, that is, the conducting lines for a circuit have been made by selectively etching a completely metal-clad substrate plate. In this method, the metalized surface is coated with an acid-resistant material, commonly called "resist," so that the desired circuit areas are covered. The unprotected metal areas are then completely removed in a chemical etching bath.

More recently there has been discovered a process whereby both the conductive lines and the resistor elements may be formed as electrical parts of the printed circuit thus eliminating the separate handling and soldering of the resistor components and providing a more compact printed circuit. Such a circuit board and the process of producing both conducting lines and resistors on such a board are disclosed in copending application Ser. No. 712,355, filed January 31, 1958, by Mitchell Baker, now U.S. Patent 3,061,911.

With the growing change from tube circuits to transistor circuits, a new technique known as microminiaturization has led to the development of a module system of forming electric assemblies. This system has been pioneered by Diamond Ordnance Fuze Laboratories. In this system a flat plate or substrate is processed to form the resistors, condensers and conductive lines, while the three dimensional components, generally as packaged elements such as transistors and diodes, are inserted to form the completed circuit. As the thin film circuit elements, that is, the resistors, condensers and conductive lines are formed on the wafer itself, they are essentially two-dimensional circuit components. Thus, such circuits are generally termed two-dimensional or 2D circuits. Heretofore, 2D circuits have been formed by evaporation processes, as by forming stencils corresponding to the separate circuit elements and successively evaporating the different compounds through the successive stencils thereby forming the precise circuit elements in the precise place desired on the substrate.

The present invention contemplates the formation of all the thin film circuit elements, that is, resistors, conductive lines and capacitors in a two-dimensional printed circuit as an integral part of the circuit. Accordingly, it is an object of the present invention to eliminate the separate handling and soldering of both resistor and capacitor components.

It is a further object of the invention to provide for more compact printed circuits.

It is also an object of the invention to form conducting lines, resistors and capacitors merely by successive stenciling and chemical etching of a multiple-layered precoated substrate without the necessity for separate evaporation steps.

To achieve these general objects and characteristic features, a novel printed circuit panel is constructed by applying to a substrate plate or base of a dielectric material first a layer of a material having the desired order of resistivity to form the resistive circuit elements of the particular circuit to be formed, then a layer of conductive material, then on top of one portion of the conductive layer there is formed a layer of a dielectric material and a final uniform layer of conductive material over the entire plate. These successive films are generally deposited by vacuum evaporation. The circuit plate differs from conventional two-dimensional plates in that the individual layers are not deposited in a specific circuit geometric pattern and may be formed by evaporating the material to the substrate without benefit of masking except for the dielectric evaporation only. The geometry of the individual layers is determined by selective etching after the plates are removed from the vacuum chamber. Provision can also be made for stacking the wafers into modules and desirably the wafers may be used in connection with a novel interconnection system which also employs etching techniques to connect the active elements to the circuits and to make the necessary connections between wafers without benefit of soldered wired connections as described and claimed in our copending application filed herewith.

The invention will be more clearly understood from the following description, reference being made to the following drawings wherein:

FIGS. 1(*a*), (*b*), (*c*), (*d*) and (*e*) show the plan view of a 2D printed circuit panel constructed in accordance with the invention.

FIGS. 2 through 5 are plan views of a printed circuit panel according to another embodiment of the invention.

FIGS. 2(*a*) through 5(*a*) are cross-sectional views of the printed circuit panels shown in FIGS. 2 through 5.

FIGS. 6 through 9 inclusive illustrate the successive steps in the process of producing a final 2D printed circuit board according to the instant invention.

FIGS. 6(*a*) through 9(*a*) inclusive are cross-sectional views illustrating the successive steps in forming a printed circuit and correspond to the views illustrated in FIGS. 6 through 9.

FIG. 10 is a plan view of a two-dimensional printed circuit panel containing conductive lines, resistors and capacitors constructed according to the instant invention as illustrated in FIGS. 6 through 9; and FIG. 11 shows another completed printed circuit containing conducting lines, resistors and capacitors constructed according to the instant invention utilizing the master circuit board shown in FIGS. 1(*a*), (*b*), (*c*), (*d*) and (*e*).

It is pointed out that the various figures are merely illustrative and are not intended to be limited to any specific printed circuit and that the thickness of certain elements have been exaggerated for clarity of illustration.

With more particular reference to the drawings, FIG. 1 illustrates the fabrication of a two-dimensional RC circuit plate as follows:

A dielectric substrate 10 as of a ceramic or phenolformaldehyde resin or other suitable material is placed in a vacuum evaporator equipped with three separate evaporation boats, one for each type of material to be deposited. The deposition steps are shown in FIGS. 1(*a*) through (*d*). First, a resistive material 11 is evaporated to the dielectric wafer as shown in FIG. 1(*a*). When the proper thickness has been deposited, as indicated by a monitoring resistor, a layer of conductive material 12 is evaporated as shown in FIG. 1(*b*). At the completion of this evaporation a mask or shutter is rotated in front of the wafer as shown in FIG. 1(*c*) and the dielectric material 13 is evaporated through this mask. The purpose of the mask is not to form a specific component geometry but to restrict the dielectric film to a particular area of the wafer. The 2D master circuit plate is completed by removing the mask and again evaporating a conductive film 14 over the entire surface of the substrate as shown in FIG. 1(*d*). It should be pointed out that the various films are preferably deposited without breaking the vacuum during evaporation.

Another embodiment of the 2D printed circuit plate is shown in FIGS. 2 through 5 inclusive. Again, three separate boats are used for preparing the plate. The dielectric substrate 10 was placed in an evacuation chamber and a bar mask 15 placed entirely across the width of the substrate close to one end. With this mask in place first a uniform layer of a resistive material 11 was evaporated on the substrate as shown in FIGS. 2 and 2(*a*) and then a uniform layer of a conductive material 12 as shown in FIGS. 3 and 3(*a*). Then the mask was rotated away from the plate and a stencil position over the plate and the delectric 13 evaporated athrough the stencil as shown in FIGS. 4 and 4(*a*). The stencil was then in turn rotated away from the plate and again an uniform layer of conductor 14 coated over the entire surface of the plate as shown in FIGS. 5 and 5(*a*).

The convert the master circuit plate shown in FIGS. 1 and 5 to a functional RC circuit, a series of stenciling and etching steps are necessary. This stenciling may be done xerographically, by means of silk screening or other suitable processes. Because of its speed and versatility xerographic stenciling has been preferred. A suitable process for accomplishing xerographic stenciling is disclosed in U.S. 2,919,179 to E. M. Van Wagner. In effect, the stenciling is accomplished by first exposing a positively charged selenium plate to an image of the desired circuit pattern. This results in a photoexact latent electrostatic image on the selenium surface. Second, developing the electrostatic image by cascading negatively charged plastic powders over the selenium plate. The particles adhere to the plate only in the image areas. Third, transferring the powder image to the circuit wafer by placing the wafer in contact with the image and charging the back of the wafer positively. (In an embodiment disclosed by Van Wagner, a thin flexible sheet, as of polyethylene terephthalate, cellulose acetate, etc., is placed on the xerographic plate and the back of the sheet charged positively to attract the powder image to the sheet. The sheet, now carrying the powder image, is placed on the wafer and the back of the sheet charged negatively repelling the powder image from the sheet to the wafer.) Finally, fourth, fixing the image on the wafer as by exposing it to solvent vapors. Where very high resolution has been required, the use of a photoresist material has been preferred.

In a specific embodiment of the invention as shown in FIGS. 2 through 5, a ceramic substrate or base 10 was cleaned and then mounted in a vacuum chamber and the chamber evacuated. An internal heater was used to heat the substrate at a temperature of about 350° C. and a bar mask positioned across the substrate. Chromium was then evaporated to provide a uniform 100 ohm-sq. on the substrate. After a short period of simultaneous evaporation which forms a chromium-copper layer, the chromium evaporation was stopped and copper was evaporated to provide a uniform layer on the substrate. The mixed layer of chromium and copper is required to produce desirable bonding characteristics and to make it possible to solder to the copper film, but is not shown in the drawings since it has no particular significance to this invention. When the monitoring resistor indicated a resistivity of approximately 1 ohm. the evaporation of the copper was stopped and the mask was rotated away from the wafer and a stencil outlining the area for the dielectric was placed over the wafer without breaking the vacuum. Silicon monoxide was then evaporated through the stencil onto the substrate. The evaporation was monitored optically so that a film approximately one micron thick was formed in the area of the stencil whereupon the evaporation was stopped. When the silicon monoxide had been completely evaporated, the stencil was rotated away from the plate and a uniform layer of copper was evaporated over the entire plate of sufficient thickness so that the monitoring resistor indicated a resistivity of about 1 ohm in the area over the dielectric.

By utilizing xerography for forming the stencils on the 2D RC circuit wafer, a complete printed circuit was formed as illustrated in FIGS. 6 through 9. As shown in FIG. 6 a resist was applied to the top conductive surface of the circuit wafer. This resist corresponded to the conducting lines for the resistors 17(*a*), the capacitor top plates 17(*b*), the conducting lines for the capacitor top plates 17(*c*), and the conducting line for the capacitor bottom plate 17(*d*). The resist was fused in place by exposure to solvent vapor and the exposed copper removed by immersion in a solution of ferric chloride giving the structure shown in FIG. 7 consisting of the areas of copper 14 protected by the resist 17(*a*)–17(*d*), the film of now exposed dielectric 13, and the film of now exposed resistive material 11.

A second resist 18 was then applied to the wafer, this time to the surface of the resistive material 11 and fused in place. The resist corresponded to the pattern for the resistors as illustrated in FIG. 8. The unprotected chromium was removed by covering the plate with fine zinc powder and then dipping in hydrochloric acid giving the structure shown in FIG. 9 comprising the conducting lines 14 protected by the resist 17(*a*)–17(*d*), the resistors protected by resist 18 and the uniform layer of dielectric 13 having thereunder first a conductive layer 12 and then the resistive layer 11. On removal of the resists, as by washing with trichloroethylene or other solvent material, there is revealed the completed 2D RC printed circuit as shown in FIG. 10 comprising three resistors 20, the two capacitors formed by the combination of the two top electrodes 21 and the one bottom electrode 12. The two top electrodes 21 are connected to one edge of board 10 by conductive lines 22 while the bottom electrode 12 is connected to the opposite edge of the board by conductive line 19. Note that the dielectric 13 electrically isolates bottom electrode 12 and conductive line 19 from top electrodes 21 and conductive lines 22. Finally, the resistors 20 are connected to one edge of board 10 by conductive lines 23.

The completed 2D RC circuit shown in FIG. 11 is identical with that shown in FIG. 10 lacking only the conductive lines on two opposed edges of the dielectric. The provision for conductive lines on two opposed edges of the dielectric layer as in FIGS. 2 through 5 and in the completed circuit as in FIG. 10 simplifies connecting electrical leads with the capacitors, particularly when the interconnection scheme described in our co-pending application filed concurrently herewith is used.

The geometrical limitations on the deposition of dielectric layer 13 shown and described in FIG. 1C and FIG. 4 permit the formation of a basic circuit plate from which may be formed a variety of circuit shapes and component values with the selection of the materials for the conductive, resistive and dielectric layers being determined primarily, if not solely, by their electrical and physical properties. Thus, when the geometrical configurations of the dielectric layer shown are utilized in forming the basic circuit plate, the successive layers are so protected by the resists applied that chemical interaction between a particular etch and a specific layer is easily restricted to the desired reaction.

It is possible, however, by a proper selection of dielectric, conductive and resistive layers to form a basic circuit plate consisting of uniform layers of each material, i.e., without any specific geometry being required for the dielectric layer. Such a basic circuit plate can also serve as the master plate for producing a variety of circuit shapes and components described. It is essential, however, in selecting the materials for such a plate that they be so chosen to permit selective etching of the dielectric layer without harming the underlying layers.

The sequence of the evaporation steps and the resulting structures are the same as in producing the plate of FIGS. 1A through D except that in the step of forming the dielectric layer as shown in FIG. 1C, an uniform layer of the dielectric 13 is coated over the entire plate thus completely obscuring the conductive layer 12 as shown in FIG. 1(*e*). This is followed by the final evaporation to provide an uniform conductive layer 14 as shown in FIG. 1(*d*). A suitable material for such a dielectric layer is magnesium oxide. Thus, the successive layers in such a master circuit plate would comprise a ceramic or other dielectric base 10 on which is coated an uniform layer of resistive material, in this case chromium for layer 11, followed by an uniform conductive layer 12, in this case aluminum, followed by an uniform dielectric layer, in this case magnesium oxide for layer 13; and, finally, an uniform conductive layer 14, again of aluminum.

The use of such a basic circuit plate requires forming four resists. Thus, the first resist is used to form the top capacitor electrodes 17(*b*) and the conductive lines therefor 17(*c*). The second resist then permits the etching away of the portions of the dielectric layer 13 which reveal the portions of the underlying layers necessary for forming the remaining resistors and conductive lines. The third resist forms the conductive lines for the resistors 17A and the conductive line for the bottom electrode 12 of the capacitors. Note that if the second resist permits etching of the dielectric into separate sections for each capacitor so that there is no single common bottom electrode for all the capacitors, then the third resist must provide a separate conductive line for each the bottom electrode of each separate capacitor. To reduce the number of conductive lines and simplify the geometry of the printed circuit, it is preferred to common layer of dielectric (with the capacitor being determined by the top electrode) and a common bottom electrode 12 for all the capacitors. Finally, a fourth resist is formed for the resistors 18. The etchants in this particular case would be an aqueous solution of sodium hydroxide to etch the top aluminum layer thereby forming the top capacitor electrodes and the conductive layer therefor without etching the magnesium oxide. The magnesium oxide is then etched with nitric acid which selectively removes the magnesium oxide without attacking the underlying aluminum layer 12. Next, the second aluminum layer 12 is selectively etched, again with aqueous sodium hydroxide, forming conductive lines 17(*d*) and 17( *a*). Finally, the resistors are formed by etching the chromium layer 11 with hydrochloric acid and zinc dust as described.

In another combination of components for such a basic circuit plate the layers were formed of the same materials except for conductive layer 12 which was formed from nickel. In this case the magnesium oxide was removed by etching in hydrochloric acid which did not attack the underlayer of nickel. The nickel was then removed by dipping in nitric acid which did not affect the underlying chromium. These and other variations will, of course, be apparent to those skilled in the art.

In general, this embodiment of the invention removes the necessity of restricting the dielectric deposition to a particular area of the wafer while increasing the number of masking and etching steps and imposing additional restriction on the nature of the successive layers and the etchants used therewith.

While deposition of the layers has been described in terms of vacuum evaporation, it is understood that other means of deposition known to those skilled in the art may be used, as for example, ionic or electronic bombardment, chemical deposition, etc. As an example, layers of conductors such as copper may be chemically deposited as described by H. Narcus in U.S. 2,454,610; dielectrics may be chemically deposited as by dipping the substrate in magnesium methylate and hydrolyzing by heating above the boiling point of methanol to form MgO, etc.

While the process and product of the instant invention have been described as particularly useful in forming resistors, capacitors and conductive lines in a 2D printed circuit, the techniques and materials of the instant invention are capable of substantially wider use. Thus, as disclosed in U.S. 2,662,957 by Paul Eisler the fabrication of two-dimensional circuit components is a technique suitable to the fabrication of light-sensitive elements, rectifying devices, transistors, strain gauges, devices based on the thermoelectric effect, the Hall effect, etc. It is evident that the techniques and products of the instant invention are also applicable to the fabrication of such devices as cryotrons and thin film ferromagnetic and ferroelectric devices. Further, as pointed out by Dr. Eisler, the term "resistor" as used in this art has a wide range of meanings. Essentially the intsant invention makes possible the fabrication of circuit elements, either magnetic or electric, wherein there are used conductive lines, resistors (as defined in the said U.S. 2,662,957) and wherein electrodes are formed on each side of a dielectric material which electrode materials may have different electric properties, that is, while in the examples given herein layers 12 and 14 were the same, that is, copper, it is apparent that different conductive materials may be selected for each layer. Only layer 14 is utilized in forming the conductive lines connecting the various circuit elements. The conductive layer 12 is utilized solely in forming the bottom electrode across the dielectric layer. This versatility is particularly interesting in various thermoelectric devices, cryotrons, etc.

In one variation of the instant invention a continuous film of resistive material, as chromium, is deposited on the dielectric 13 and coextensive therewith on any of the master plates shown and then the conductive layer 14 coated thereon. Considering the configuration of FIG. 4 for purposes of illustration, the bottom electrode is as shown in FIG. 10, but the top electrodes 21 are omitted, and there are merely two conductive lines 22, now connected to the uniform layer of chromium overlying the dielectric, the one conductive line for the input and the other for the output. Such a combination constitutes a distributed constant RC network. Other variation in the basic concepts of the instant invention will be apparent to those skilled in the art.

It should also be noted that it is not necessary to etch the dielectric film in order to form capacitors. As the capacitance of a parallel plate capacitor is proportional to the area of the smallest electrode, capacitance values within a particular range may be determined solely by the geometry of the top electrode.

By utilizing the RC circuit plate concept, it is possible to form circuits with resistors and capacitors having a wide range of values. The range of resistance values is generally achieved by the usual method of varying the geometry of the resistive film. The variation in capacitance value is also achieved by varying the top electrode geometry. However, to cover broader ranges of resistance and particularly of capacitance, it is necessary to vary the film thickness as well.

To form a circuit utilizing the instant invention, layout drawings are made according to the ohm-sq. and capacitor per square inch value of the plate to be used. Only two drawings are required: One corresponding to the conducting lines-capacitor electrode configuration and the other corresponding to the desired resistor geometry. Actual circuit fabrication is then accomplished merely by depositing photoexact resist patterns of the layout drawings on the film surfaces and removing the undesired portions by selective etching. Where the nature of the dielectric film is such that the resistor etch is apt to attack the film, it may be desirable, in forming the resist for the resistors, to mask the dielectric area with the resist as well as the desired areas of the resistor layer.

The resulting circuit plates or modules formed from such circuit plates may be protected by potting or the individual circuit plates may be protected by deposition of a protective film as of plastic or by evaporation of silicon monoxide or other protective material.

While the present invention has been described as carried out in specific embodiments thereof, it is not desired to be limited thereby, but it is intended to cover the invention broadly within both the spirit and scope of the appended claims. Many variations in the invention will, of course, be obvious to those skilled in the art. For example, in the embodiment wherein the master circuit panel contains an uniform layer of etchable dielectric as shown in FIG. 1(*e*), it is possible by proper selection of the layers to use only three resists and either three or four etchants. Thus, for example, where the etchable dielectric is magnesium oxide and the first conductive layer is aluminum and the second or top conductive layer is nickel, the first resist placed on the second conductive layer defining the top capacitor electrodes and the conductive lines connecting the electrodes to one edge of the master circuit panel may be etched in nitric acid which will remove the exposed portions of the second conductive layer (nickel) and then the exposed areas of the dielectric (magnesium oxide) not protected by the resist placed on the second conductive layer, and without affecting the first conductive layer of aluminum. Thus, a single resist and etching bath removes both the second conductive layer and the dielectric. The aluminum and underlying resistive layer may then be successfully masked and etched as described in connection with FIG. 1(*e*).

When the first and second conductive layers are composed of the same conductive material, the same etching bath may not be used to remove both the second conductive layer and the dielectric, as the etchant will necessarily also remove the second conductive layer. However, it is still possible to use the resist on the second conductive layer as the resist for the dielectric using a separate etching bath for the dielectric. In this case simplicity in the application of resist and, if desired, in the etchant is obtained. This embodiment, of course, also requires separate conducting lines for the bottom electrodes of each capacitor and, in the case of the reduction in the number of etchant baths, places slightly greater limitations on the selection of the dielectric and requires different conductive materials for the first and second conductive layers.

We claim:

1. A multi-layer printed circuit material from which to form printed circuit components in circuited relation comprising a dielectric substrate coated on at least one side with a layer of resistance material, a first layer of conductive material bonded to said layer of resistance material, a layer of dielectric material coated on a portion only of said first layer of conductive material and bonded thereto and a second layer of conductive material uniformly covering said dielectric layer and the exposed areas of said first layer of conductive material and electrically isolated from said first layer on at least one edge of said dielectric layer.

2. A printed circuit master panel from which to form printed circuit components in circuited relation comprising a dielectric support having a layer of resistance material bonded to at least one side of said support, a first layer of conductive material bonded to said layer of resistance material, said layer of resistance material and said first layer of conductive material being divided into at least two areas by a gap in said layers running parallel to one edge and spaced therefrom and extending across said support electrically isolating the two areas, a layer of dielectric material spaced from all edges of said support and extending from contact with a first side of said gap to overlie a portion of the area of said first conductive layer extending from the opposite side of said gap from said first side, and a second layer of conductive material uniformly covering said dielectric layer and said first layer of conductive material, said layers forming a unitary laminated structure.

3. A printed circuit master panel as in claim 2 wherein said gap is filled with said dielectric material.

4. A two dimensional printed circuit comprising a dielectric support, a portion of the area of one surface of said support having at least one geometric pattern of a layer of resistance material defining an electrical resistance, two-dimensional conductive electrodes operatively connected with said electrical resistance and with one edge of said dielectric support, an arrangement of dielectric material extending from contact with a second portion of said same support surface into an overlying layer spaced apart therefrom, interposed between said dielectric and said same support surface and coextensive with the overlying layer portion of said dielectric material first a layer of conductive material contacting and bonded to said dielectric layer material and second a layer of resistance material contacting and bonded between said last recited layer of conductive material and said support surface, at least one conductive electrode on the free surface of said dielectric layer material geometrically defining with said dielectric layer material and said first layer of conductive material a capacitor electrically isolated from said first resistance layer and a two-dimensional conductive electrode operatively connecting said first layer of conductive material with one edge of said dielectric support.

References Cited by the Examiner

UNITED STATES PATENTS

| | | | |
|---|---|---|---|
| 2,662,957 | 12/53 | Eisler | 317—234 X |
| 2,694,185 | 11/54 | Kodama | 333—70 X |
| 2,758,256 | 8/56 | Eisler | 317—101 |
| 2,876,390 | 3/59 | Sanders | 317—101 |
| 2,892,131 | 6/59 | MacDonnell | 317—101 |
| 2,982,883 | 5/61 | Gordy | 317—101 |
| 2,986,804 | 6/61 | Greenman et al. | 29—115 |
| 3,037,265 | 6/62 | Kollmeir | 29—115 |
| 3,061,911 | 11/62 | Baker | 174—68.5 X |

FOREIGN PATENTS

| | | |
|---|---|---|
| 697,070 | 9/53 | Great Britain. |

JOHN F. BURNS, *Primary Examiner.*

SAMUEL BERNSTEIN, JOHN P. WILDMAN, DARRELL L. CLAY, *Examiners.*